United States Patent
Kanakarajan et al.

(10) Patent No.: US 10,013,584 B2
(45) Date of Patent: *Jul. 3, 2018

(54) APPARATUS, SYSTEM, AND METHOD FOR DETECTING THEFT OF NETWORK DEVICES

(71) Applicant: Juniper Networks, Inc., Sunnyvale, CA (US)

(72) Inventors: Ravindranath C. Kanakarajan, Bangalore (IN); Venkanna Thadishetty, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,534

(22) Filed: Mar. 27, 2017

(65) Prior Publication Data

US 2017/0200026 A1 Jul. 13, 2017

Related U.S. Application Data

(63) Continuation of application No. 14/733,399, filed on Jun. 8, 2015.

(51) Int. Cl.
*G06F 21/88* (2013.01)
*G08B 13/14* (2006.01)
(Continued)

(52) U.S. Cl.
CPC ......... *G06F 21/88* (2013.01); *G08B 13/1418* (2013.01); *H04L 41/12* (2013.01);
(Continued)

(58) Field of Classification Search
CPC ............. G06F 21/88; G06F 2221/2111; G06F 2221/2149; H04L 63/107; H04W 12/12
See application file for complete search history.

(56) References Cited

U.S. PATENT DOCUMENTS 9,220,011 B1 * 12/2015 Annan ............... H04W 12/08
2002/0170049 A1 * 11/2002 Suyehira .............. G06F 8/355
717/168
(Continued)

FOREIGN PATENT DOCUMENTS

EP 2728919 A1 5/2014
WO WO2013095596 A1 6/2013

OTHER PUBLICATIONS

Yu chao and Yuan meng-ting, "Integrity measurement of hardware based on TPM," 2010 3rd International Conference on Computer Science and Information Technology, Chengdu, 2010, pp. 507-510.*

(Continued)

*Primary Examiner* — Kari L Schmidt
(74) *Attorney, Agent, or Firm* — FisherBrolyes, LLP

(57) ABSTRACT

The disclosed apparatus may include a secure storage device that securely stores an initial geographic location of a network device that facilitates network traffic within a network. This apparatus may also include a processing unit communicatively coupled to the secure storage device. The processing unit may determine a current geographic location of the network device. The policy-enforcement unit may then detect evidence of theft of the network device by (1) comparing the current geographic location of the network device with the initial geographic location of the network device and (2) determining, based at least in part on the comparison, that the current geographic location of the network device does not match the initial geographic location of the network device. Finally, the processing unit may perform at least one security action in response to detecting the evidence of theft of the network device.

14 Claims, 6 Drawing Sheets

(51) Int. Cl.
*H04L 12/24* (2006.01)
*H04W 12/12* (2009.01)
*H04L 29/06* (2006.01)

(52) U.S. Cl.
CPC ...... *H04L 41/28* (2013.01); *G06F 2221/2111* (2013.01); *G06F 2221/2149* (2013.01); *H04L 63/107* (2013.01); *H04W 12/12* (2013.01)

(56) References Cited

U.S. PATENT DOCUMENTS

| | | | |
|---|---|---|---|
| 2003/0188179 A1* | 10/2003 | Challener | G06F 21/57 713/193 |
| 2004/0203601 A1 | 10/2004 | Morriss et al. | |
| 2005/0044404 A1* | 2/2005 | Bhansali | G06F 21/572 726/26 |
| 2006/0143717 A1* | 6/2006 | Ransome | G06F 21/88 726/35 |
| 2007/0028122 A1 | 2/2007 | Chuang | |
| 2007/0138999 A1* | 6/2007 | Lee | H02J 7/00 320/107 |
| 2008/0046768 A1* | 2/2008 | Chuang | G06F 1/30 713/300 |
| 2008/0209515 A1* | 8/2008 | Ibrahim | G06F 21/6218 726/3 |
| 2008/0222692 A1* | 9/2008 | Andersson | G06F 21/33 726/1 |
| 2008/0267194 A1 | 10/2008 | Trethewey | |
| 2009/0085761 A1 | 4/2009 | Buer | |
| 2009/0327678 A1 | 12/2009 | Dutton et al. | |
| 2010/0037323 A1 | 2/2010 | Lemieux et al. | |
| 2010/0042629 A1* | 2/2010 | Fukatani | G06F 11/2289 709/212 |
| 2012/0117209 A1 | 5/2012 | Sinha | |
| 2012/0159156 A1* | 6/2012 | Barham | G06F 21/6218 713/156 |
| 2013/0042011 A1 | 2/2013 | Sugizaki et al. | |
| 2013/0124840 A1* | 5/2013 | Diluoffo | G06F 21/575 713/2 |
| 2014/0068028 A1 | 3/2014 | Sakai et al. | |
| 2014/0191868 A1* | 7/2014 | Ortiz | H04W 4/028 340/539.13 |
| 2016/0065428 A1 | 3/2016 | Srivastava et al. | |
| 2017/0222878 A1* | 8/2017 | Jacquin | H04W 76/025 |

OTHER PUBLICATIONS

Jayaram, K. R., et al. "Trustworthy geographically fenced hybrid clouds." Proceedings of the 15th international middleware conference. ACM, 2014, pp. 37-48.*

Anand Narayanan Rao, et al; Apparatus, System, and Method for Applying Policies to Network Traffic on Specific Days; U.S. Appl. No. 14/674,616, filed Mar. 31, 2015.

Mathscinotes; "Dying Gasp" from a Circuit Standpoint; http://mathscinotes.com/2011/02/dying-gasp-from-a-circuit-standpoint/, as accessed Apr. 28, 2015; Math Encounters Blog.

Mobile phone tracking; https://en.wikipedia.org/wiki/Mobile_phone_tracking, as accessed Apr. 28, 2015; Wikipedia.

Ravindranath C. Kanakarajan, et al; Apparatus, System, and Method for Detecting Theft of Network Devices; U.S. Appl. No. 14/733,399, filed Jun. 8, 2015.

Trusted Execution Technology; https://en.wikipedia.org/wiki/Trusted_Execution_Technology, as accessed Apr. 28, 2015; Wikipedia.

Venkanna Thadishetty; Apparatus, System, and Method for Detecting Device Tampering; U.S. Appl. No. 14/559,494, filed Dec. 12, 2014.

* cited by examiner

Apparatus 100

Initial Location Information
104

GPS Coordinates: 44.9442° N, 93.0936° W

Current Location Information
302

GPS Coordinates: 44.9778° N, 93.2650° W

FIG. 3

APPARATUS, SYSTEM, AND METHOD FOR DETECTING THEFT OF NETWORK DEVICES

CROSS REFERENCE TO RELATED APPLICATION

This application is a continuation of U.S. application Ser. No. 14/733,399, filed 8 Jun. 2015, the disclosure of which is incorporated, by this reference, in its entirety.

BACKGROUND

Network devices (such as gateways, routers, and/or switches) often facilitate network traffic within networks and/or across multiple networks. These devices may provide users of internet-enabled devices with fast, flexible, and/or widespread multi-media communication with various websites and online services. Network devices may be installed and/or deployed in a variety of situations and locations, including homes, offices, restaurants, and even outdoor and/or public locations such as street sides or ail ay lines. In one example, a university may install routers and/or wireless access points in multiple locations across its campus. In another example, a package delivery enterprise may deploy network devices outside warehouses or along delivery routes.

While installing network devices in such locations may enable efficient and widespread internet access for employees, customers, and/or the general public, network devices deployed outside or in unsecure locations may be exposed to increased risks of theft. Theft of network devices may incur costs and inconveniences for enterprises that manage the devices. In addition, stealing network devices may allow perpetrators access to sensitive information stored within and/or handled by the devices. Unfortunately, traditional methods for identifying theft of network devices may be unable to accurately and/or efficiently detect threats of theft in real time.

The instant disclosure, therefore, identifies and addresses a need for unproved apparatuses, systems, and methods for detecting theft of network devices.

SUMMARY

As will be described in greater detail below, the instant disclosure generally relates to apparatuses, systems, and methods for detecting theft of network devices. In one example, an apparatus for accomplishing such a task may include a secure storage device that securely stores an initial geographic location of a network device that facilitates network traffic within a network. This apparatus may also include a processing unit communicatively coupled to the secure storage device. The processing unit may determine a current geographic location of the network device that facilitates network traffic within the network. The policy-enforcement unit may then detect evidence of theft of the network device by (1) comparing the current geographic location of the network device with the initial geographic location of the network device securely stored in the secure storage device and (2) determining, based at least in part on the comparison, that the current geographic location of the network device does not match the initial geographic location of the network device. Finally, the processing unit may perform at least one security action in response to detecting the evidence of theft of the network device.

Similarly, a system incorporating the above-described apparatus may include a Trusted Platform Module (TPM) chip that securely stores an initial geographic location of a router that facilitates network traffic within a network. This system may also include a processing unit communicatively coupled to the TPM chip. The processing unit may determine a current geographic location of the router that facilitates network traffic within the network. The processing unit may then detect evidence of theft of the router by (1) comparing the current geographic location of the router with the initial geographic location of the router securely stored in the TPM chip and (2) determining, based at least in part on the comparison, that the current geographic location of the router does not match the initial geographic location of the router. Finally, the processing unit may perform at least one security action in response to detecting the evidence of theft of the router.

A corresponding method may include determining a current geographic location of a network device that facilitates network traffic within a network. This method may also include detecting evidence of theft of the network device by (1) comparing the current geographic location of the network device with an initial geographic location of the network device securely stored in connection with the network device and (2) determining, based at least in part on the comparison, that the current geographic location of the network device does not match the initial geographic location of the network device. In addition, the method may include performing at least one security action in response to detecting the evidence of theft of the network device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 is an illustration of exemplary information that identifies locations of network devices.

Figure 1:
FIG. 1 is a block diagram of an exemplary apparatus for detecting theft of network devices.
Figure 1:
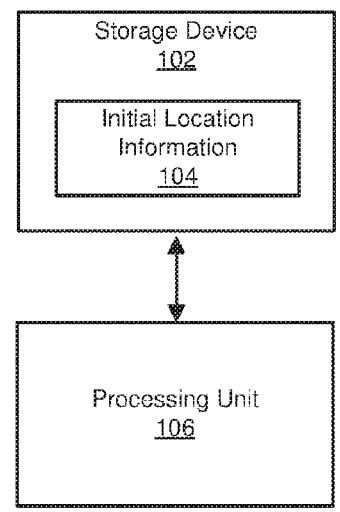

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for detecting theft of network devices. As will be explained in greater detail below, by periodically determining the geographic location of a network device, the various apparatuses, systems, and methods described herein may determine that the network device is currently in an unexpected or unusual location. As such, the disclosed apparatuses, systems, and methods may conclude that the network device has been stolen or otherwise removed without authorization.

In addition, the various apparatuses, systems, and methods described herein may be able to take action to minimize the risk and/or damages incurred by loss of network devices. For example, by directing a network device to enter a restricted mode of operation in response to detecting evidence of theft of the network device, the disclosed apparatuses, systems, and methods may prevent unauthorized users from accessing data stored within the device and/or using the device to facilitate network traffic. Furthermore, by distributing a notification to an administrator immediately upon detecting evidence of theft of a network device, the various apparatuses, systems, and methods described herein may provide real-time notifications, warnings, and/or updates concerning theft of the network device.

The following will provide, with reference to FIG. 1, a detailed description of an exemplary apparatus that facilitates detecting theft of network devices. The discussion corresponding to FIG. 2 and will provide a detailed description of an exemplary implementation that facilitates detecting theft of network devices. In addition, the discussion corresponding to FIGS. 3 and 4 will provide detailed descriptions of exemplary information that identifies locations of network devices and exemplary locations of network devices, respectively. The discussion corresponding to FIG. 5 will provide a detailed description of an exemplary method for detecting theft of network devices. Finally, the discussion corresponding to FIG. 6 will provide numerous examples of systems that may include the apparatus shown in FIG. 1.

FIG. 1 shows a block diagram of an exemplary apparatus 100 for detecting theft of network devices. The term "theft of a network device," as used herein, generally refers to any unauthorized, unscheduled, and/or undesired relocation of a network device that removes the network device from the physical control of an administrator or enterprise that owns and/or manages the network device. In addition, the term "evidence of theft of a network device," as used herein, generally refers to any type or form of indication or suggestion that the network device may have potentially been stolen.

As illustrated in FIG. 1, apparatus 100 may include a storage device 102. The term "storage device," as used herein, generally refers to any type or form of digital memory capable of storing, recording, and/or accessing data. In some examples, storage device 102 may include and/or represent an external storage device (e.g., an external hard drive or server). In other examples, storage device 102 may include and/or represent an internal storage device (e.g., an internal hard drive or portion of Random Access Memory (RAM) or Read-Only Memory (ROM) within apparatus 100).

In some embodiments, storage device 102 may securely store data such that the data may not be accessed without proper authentication (e.g., a password or cryptographic key). Storage device 102 may implement any physical and/or software-based authentication scheme to protect the contents of storage device 102. In an exemplary embodiment, all or a portion of storage device 102 may include and/or represent a TPM chip. The term "TPM chip," as used herein, generally refers to any type or form of microprocessor or other computing platform that integrates cryptographic keys into computing devices.

In some examples, a TPM chip may be encoded with a unique private key (and a corresponding public key) during manufacture in order to reduce the risk of an unauthorized party accessing the private key. Additionally or alternatively, a TPM chip may encrypt data with a public key and then store the encrypted data. As data encrypted with a public key may only be decrypted with a corresponding private key, the encrypted data may not be tampered with or altered by any individual or entity that does not have knowledge of the private key. In one example, a TPM chip implemented within a device may decrypt, using a private key, data encrypted with a public key as part of a verification procedure during a boot up operation of the device. As will be explained in greater detail below, the disclosed apparatuses, systems, and methods may utilize a TPM chip within a network device to help detect and/or prevent theft of the network device.

In some examples, storage device 102 may include or store an initial location information 104. The term "location," as used herein, generally refers to any type or form of physical or geographical place, position, area, or region in which a computing device may be temporarily or permanently located. Examples of locations include, without limitation, Global Positioning System (GPS) coordinates, geo-locations, streets, addresses, neighborhoods, cities, combinations of one or more of the same, variations of one or more of the same, and/or any additional type of location. In addition, the term "initial location," as used herein, generally refers to any established, original, reference, and/or home location of a computing device. Furthermore, the term "location information," as used herein, generally refers to any type or form of data, text, and/or computer-executable code that describes a location of a computing device.

As an example of location information that may be stored within storage device 102, FIG. 3 illustrates an exemplary initial location information 104. As shown in FIG. 3, initial location information 104 may describe an initial location of a network device with the GPS coordinates "44.9942° N, 93.0936° W" (corresponding to St. Paul, Minn.)

Returning to FIG. 1, storage device 102 may be communicatively coupled to a processing unit 106. The term "processing unit," as used herein, generally refers to any type, form, or portion of physical hardware, circuit, device, and/or processor that performs certain Input/Output (I/O) operations and/or computing tasks directed to detecting theft of network devices. In one example, processing unit 106 may represent an integrated circuit whose configuration and/or infrastructure is at least partially fixed. Additionally or alternatively, processing unit 106 may represent an integrated circuit whose configuration and/or infrastructure is at least partially variable and/or programmable. Examples of processing unit 106 include, without limitation, Field Programmable Gate Arrays (FPGAs), Central Processing Units (CPUs), processors, microprocessors, microcontrollers, Application-Specific Integrated Circuits (ASICs), software modules installed on one or more of the same, portions of one or more of the same, variations of one or more of the same, combinations of one or more of the same, or any other suitable processing unit.

Figure 2:
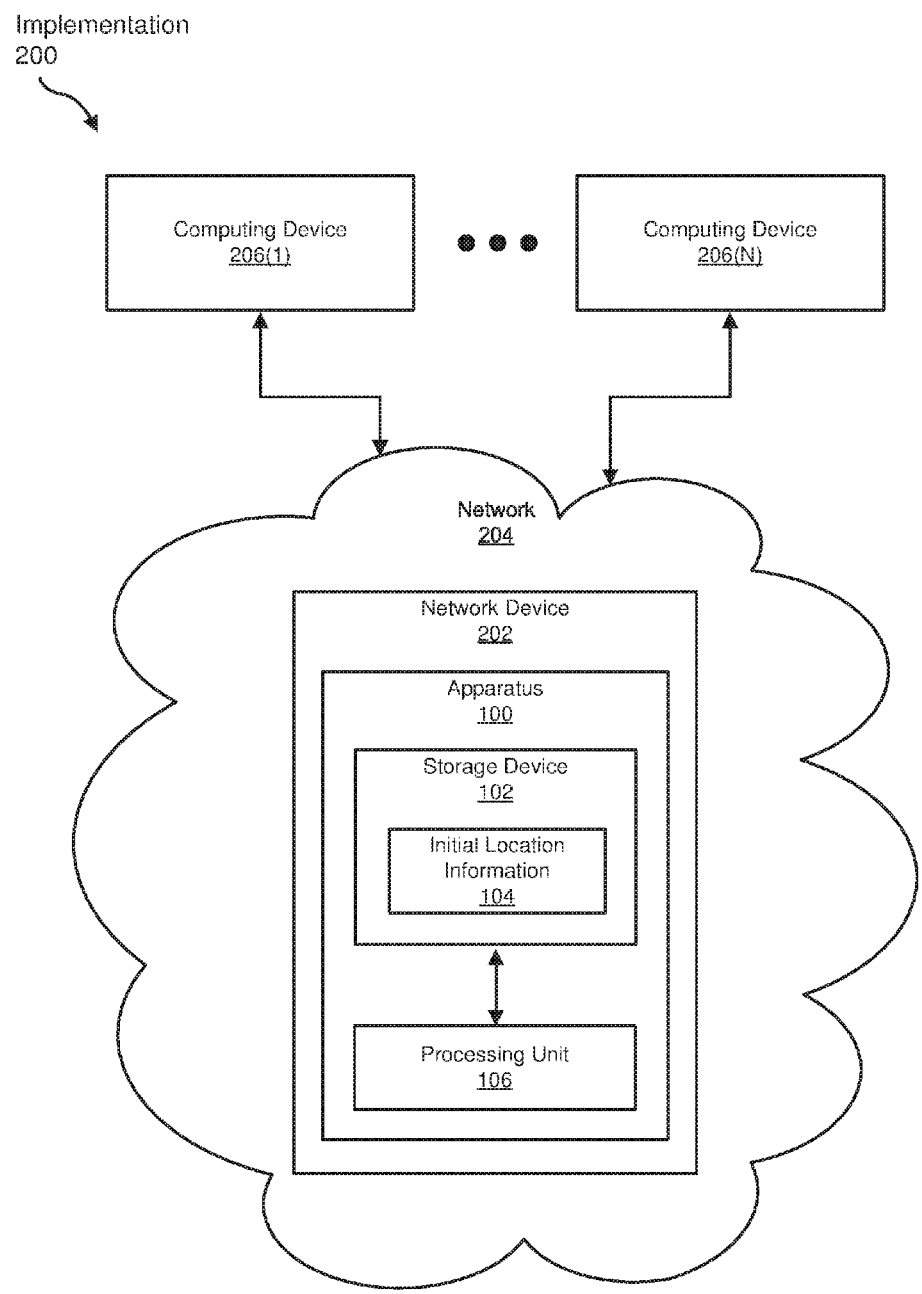
FIG. 2 is a block diagram of an exemplary implementation of an apparatus for detecting theft of network devices.

FIG. 2 shows a block diagram of an exemplary implementation 200 that includes apparatus 100 for detecting theft of network devices. As illustrated in FIG. 2, implementation 200 may include a network device 202 in communication with computing devices 206(1)-(N) via a network 204. The term "network," as used herein, generally refers to any type or form of medium and/or architecture that facilitates communication or data transfer. Examples of network 204 include, without limitation, an intranet, a Local Area Network (LAN), a Wide Area Network (WAN), a wireless LAN, a Personal Area Network (PAN), the Internet, a Power Line Communications (PLC) network, a cellular network (e.g., a Global System for Mobile Communications (GSM) network), portions of one or more of the same, or any other suitable network. Network 204 may facilitate communication or data transfer using wireless and/or wired connections.

In addition, the term "network device," as used herein, generally refers to any type or form of device, apparatus, system, and/or application capable of routing and/or forwarding network traffic among devices within a single network (e.g., a LAN) or across multiple networks (e.g., multiple WANs). Examples of network device 202 include, without limitation, routers, GSM modems, gateways, switches, hubs, repeaters, combinations of one or more of the same, variations of one or more of the same, and/or any additional type of network device. In an exemplary embodiment, network device 202 may represent a network device specifically designed for outdoor use (such as JUNIPER NETWORKS' ACX500-O router).

In some examples, network device 202 may facilitate network traffic between multiple computing devices, such as one or more of computing devices 206(1)-(N). The term "network traffic," as used herein, generally refers to any type or form of data transfer occurring within a network and/or passing from one network to another. In some examples, network traffic may refer to the transfer of one or more packets between multiple computing devices. The terms "packet" and "data packet," as used herein, generally refer to any type of form of package, encapsulation, abstraction, and/or object that includes one or more formatted units of data.

Computing devices 206(1)-(N) generally represent any type or for of device capable of sending and/or receiving packets. Examples of computing devices 206(1)-(N) include, without limitation, desktop computers, laptops, mobile devices, internet-enabled televisions and/or BLU-RAY players, servers, network devices, variations of one or more of the same, combinations of one or more of the same, and/or any additional type of computing device.

Although FIG. 2 illustrates network device 202 within network 204, network device 202 may communicate with computing devices 206(1)-(N) (and any additional computing devices) via any additional network. Furthermore, network device 202 need not continuously facilitate, forward, or route network traffic within network 204 or another network. For example, in the event that network device 202 is stolen, the disclosed apparatuses, systems, and methods may prevent network device 202 from facilitating network traffic within network 204 or any additional network.

Moreover, network device 202 may be deployed in a variety of locations and for a variety of purposes. For example, network device 202 may be installed within a public transportation vehicle in order to provide passengers with wireless Internet services. In another example, network device 202 may be installed outside a warehouse or manufacturing plant in order to facilitate tracking incoming and/or outgoing shipments. In general, network device 202 may be installed in any type or form of building, vehicle, or outdoor location. In exemplary embodiments, the apparatuses, systems, and methods described herein may be used to detect and/or prevent the theft of network devices that are deployed outside, in public buildings, or in otherwise unsecure locations that have an increased the risk of theft.

As illustrated in FIG. 2, network device 202 may include all or a portion of apparatus 100 in FIG. 1. For example, storage device 102 and processing unit 106 may represent any portion of memory and/or execution space within and/or in communication with network device 202. Accordingly, network device 202 may receive, store, and/or access initial location information 104 within storage device 102 via processing unit 106. In some embodiments, processing unit 106 within network device 202 may receive initial location information 104 from an administrator or enterprise that manages network device 202. For example, an administrator of network device 202 may configure network device 202 with initial location information 104 before or while deploying network device 202 at its initial location.

An administrator of network device 202 may configure network device 202 with initial location information 104 in a variety of ways. In an exemplary embodiment, an administrator may direct processing unit 106 to identify the initial location of network device 202 by querying a GPS within network device 202. Processing unit 106 may also identify the initial location of network device 202 using techniques such as IP address geolocation, multilateration, signal strength analyses, combinations of one or more of the same, variations of one or more of the same, and/or additional geolocation technology. After the initial location is identified, the administrator may prompt network device 202 to store information indicating the location as initial location information 104. In another embodiment, an administrator may manually type a location (e.g., a street address) into a user interface of network device 202. Furthermore, an administrator may enter a geographic area or range of locations in which network device 202 may be located (e.g., in the event that network device 202 may be deployed in multiple locations within a large building or installed within a moving vehicle that follows a certain route).

Processing unit 106 may take one or more measures to ensure the security of initial location information 104 within storage device 102. For example, processing unit 106 may require that an administrator enter proper authentication credentials (e.g., a username and/or password) into network device 202 before entering initial location information 104 (or before updating initial location information 104 in the event that network device 202 is relocated). Additionally or alternatively, processing unit 106 may direct a TPM chip within storage device 102 to encrypt initial location information 104 with a cryptographic key.

After storage device 102 receives and stores initial location information 104, processing unit 106 may periodically determine the current location of network device 202. The term "current location," as used herein, generally refers to the most up-to-date location in which a computing device is presently located. Processing unit 106 may determine the current location of network device 202 in any suitable way, including using any one or combination of the geolocation techniques discussed above in connection with determining the initial location of network device 202.

In some examples, processing unit 106 may determine the current location of network device 202 at certain intervals (e.g., every 5 seconds, every minute, etc.) while network device 202 is in operation. Additionally or alternatively, processing unit 106 may determine the current location of network device 202 in response to a reboot of the network device. In some embodiments, an administrator of network device 202 may specify the periodic basis at which processing unit 106 determines the current location of network device 202.

After determining the current location of network device 202, processing unit 106 may store information that identifies the current location (e.g., within a cache or other fast-access portion of memory of processing unit 106). As an example of information that identifies the current location of a network device, FIG. 3 illustrates a current location information 302. In this example, current location information 302 may describe the current location of network device 202 with the GPS coordinates "44.9778° N, 93.2650° W" (corresponding to Minneapolis, Minn.).

Each time processing unit 106 determines the current location of network device 202, processing unit 106 may compare the current location with the initial location of network device 202. In one example, processing unit 106 may determine whether the GPS coordinates that describe the current location of network device 202 match the GPS coordinates that describe the initial location of network device 202. In another example, processing unit 106 may determine whether network device 202 is located at the same address at which network device 202 was originally installed. In these examples, processing unit 106 may detect evidence of theft of network device 202 in the event that the information used to describe the initial and current locations (e.g., addresses and/or GPS coordinates) do not match.

In other examples, processing unit 106 may determine whether the current location of network device 202 is within a certain distance of the initial location of network device 202. For example, processing unit 106 may determine whether the current location of network device 202 meets a threshold of being within half a mile of the initial location, a threshold of being within the same neighborhood as the initial location, or a threshold of being within the same city as the initial location. In these examples, processing unit 106 may detect evidence of theft of network device 202 in the event that the current location of network device 202 is beyond the specified threshold from the initial location of network device 202. In this way, the disclosed apparatuses, systems, and methods may account for normal error in calculating locations of network device 202 and/or normal movement of network device 202 (e.g., within an enterprise's buildings or campus).

Figure 4:
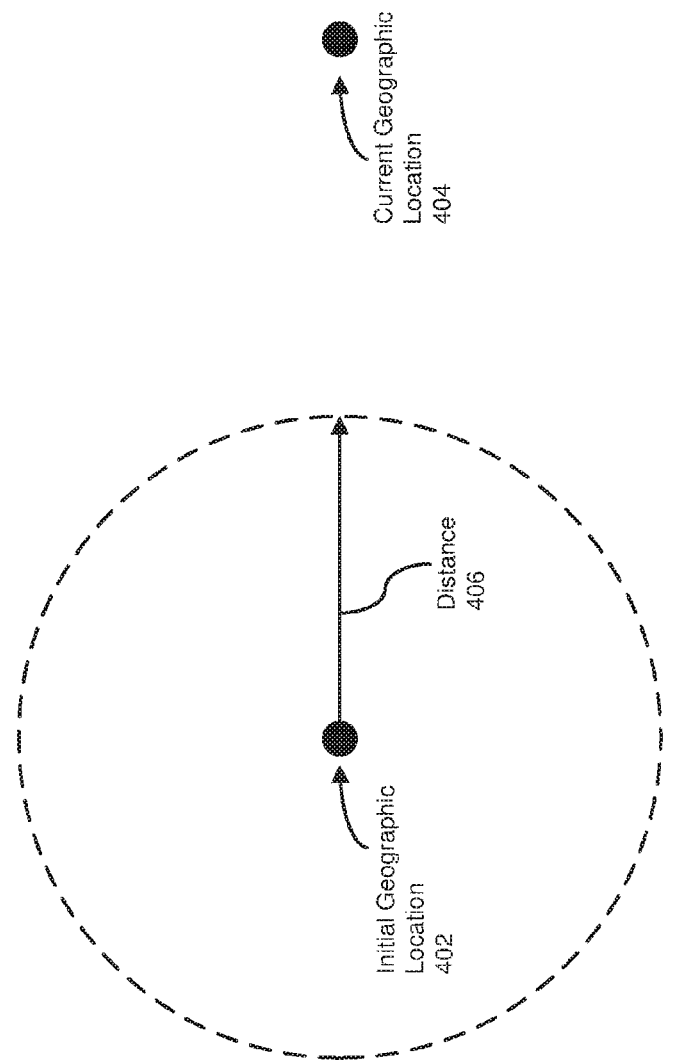
FIG. 4 is an illustration of exemplary locations of network devices.

As an example of determining whether a current location of a network device is within a certain distance of an initial location, FIG. 4 illustrates an initial geographic location 402 and a current geographic location 404. As shown in FIG. 4, current geographic location 404 may be beyond initial geographic location 402 by more than a distance 406. In one example, initial geographic location 402 may represent the location specified by initial location information 104 in FIG. 3. Current geographic location 404 may represent the location specified by current location information 302. In addition, distance 406 may represent a distance of one mile.

In this example, processing unit 106 may compare the GPS coordinates within initial location information 104 (describing initial geographic location 402) with the GPS coordinates within current location information 302 (describing current geographic location 404). Based on the comparison, processing unit 106 may determine that the current location of network device 202 (Minneapolis, Minn.) is 8.76 miles away from the initial location of network device 202 (St. Paul, Minn.). Because current geographic location 404 is beyond distance 406 from initial geographic location 402, processing unit 106 may determine that current geographic location 404 does not match initial geographic location 402. As such, processing unit 106 may detect evidence of theft of network device 202.

Processing unit 106 may perform any of a variety of security actions in response to detecting evidence of theft of network device 202. In some examples, processing unit 106 may direct network device 202 to operate within a restricted mode of operation that imposes limitations on the behavior and/or functionality of network device 202. In one example, processing unit 106 may direct network device 202 to operate within a restricted mode of operation by preventing network device 202 from performing a boot up operation. In this example, a TPM chip within storage device 102 may store the initial location of network device 202 within a Platform Configuration Register (PCR). Processing unit 106 may bind the PCR register with boot up operations of network device 202 such that network device 202 is prevented from booting up in the event that processing unit 106 determines that the current location of network device 202 does not match the initial location of network device 202 stored within the PCR. Conversely, the TPM chip within storage device 102 may permit network device 202 to boot up normally in response to determining that the current location of network device 202 matches the initial location of network device 202.

In another example, processing unit 106 may direct network device 202 to operate within a restricted mode of operation by preventing network device 202 from facilitating network traffic. For example, processing unit 106 may hold or delete all or a portion of the packets distributed to network device 202 instead of forwarding the packets to their intended destinations. Additionally or alternatively, processing unit 106 may prevent any changes from being made to the configuration of network device 202. For example, processing unit 106 may prevent a thief from configuring network device 202 to facilitate network traffic within their own network.

Besides limiting the capabilities of network device 202 to facilitate network traffic, processing unit 106 may enforce a restricted mode of operation within network device 202 by preventing a user from accessing data stored within network device 202. For example, processing unit 106 may prohibit data from being transferred via Universal Serial Bus (USB) ports, Advanced Technology Attachment (ATA) ports, FIREWIRE ports, and/or any additional type of data transfer port. In this way, processing unit 106 may protect the contents of sensitive data stored within and/or handled by network device 202.

In some examples, processing unit 106 may confine network device 202 to a restricted mode of operation until determining that network device 202 is no longer under the threat of theft or in possession of a thief. For example, processing unit 106 may enforce the restricted mode of operation until determining that network device 202 has been returned to its initial geographic location. Additionally or alternatively, processing unit 106 may enforce the restricted mode of operation until determining that a user has entered, into network device 202, authentication credentials that enable network device 202 to return to a normal mode of operation and/or vindicate the user.

As an example, after directing network device 202 to operate within the restricted mode of operation, processing unit 106 may prompt (e.g., via a user interface of network device 202) an administrator of network device 202 to enter a password and/or username. Processing unit 106 may then compare the entered credentials with a predefined set of credentials (e.g., stored within a TPM chip in storage device 102). In the event that the entered credentials match the stored credentials, processing unit 106 may lift any restrictions imposed on the functionality of network device 202, enabling network device 202 to return to its original mode of operation. In the event that the entered credentials do not match the stored credentials, processing unit 106 may continue to impose the restricted mode of operation and/or notify an administrator of network device 202 about the incorrectly entered credentials.

In addition to or instead of directing network device 202 to operate within a restricted mode of operation, processing unit 106 may notify an administrator in response to detecting evidence of theft of network device 202. For example, processing unit 106 may distribute, via network 204, a message (e.g., an email, text, or Short Media Message (SMS)) to a predetermined destination (e.g., an email address, phone number, or website managed by an administrator). The message may contain any of a variety of information about the evidence of theft of network device 202, such as the location and/or time at which the potential theft occurred.

In some examples, processing unit 106 may direct network device 202 to continue to update the administrator with the current location of network device 202 until determining that network device 202 is no longer under the threat of theft. For example, processing unit 106 may continue to update the administrator until a user has entered appropriate authentication credentials into network device 202 or until network device 202 returns to its initial location. After a user enters the appropriate authentication credentials and/or network device 202 has returned to its initial location, processing unit 106 may distribute a final message to the administrator of network device 202. The final message may notify the administrator of the current location of network device 202 and/or that a user has overridden the restricted mode of operation.

In some examples, an enterprise may configure multiple network devices with the anti-theft apparatuses, systems, and methods described herein. In these examples, the network devices may be in communication with a central server that receives notifications about potential thefts of the network devices. In some embodiments, the central server may distribute the notifications to appropriate parties (e.g., specific technicians or managers of the network devices). In addition, the central server may direct the network devices to comply with certain modes of operation and/or perform any additional task related to maintaining the security of the network devices.

In some embodiments, processing unit 106 may be unable to accurately identify the current location of network device 202. For example, a GPS within network device 202 may be non-functional due to inclement weather or damaged parts. In these embodiments, processing unit 106 may direct network device 202 to operate within a restricted mode of operation, as processing unit 106 may be unable to verify that network device 202 has not been stolen. However, processing unit 106 may enable network device 202 to return to a normal mode of operation in response to a user entering appropriate authentication credentials into network device 202.

In some examples, processing unit 106 may monitor network device 202 for additional evidence of theft of network device 202. For example, an individual that is attempting to steal network device 202 may disconnect network device 202 from an external power supply that provides power to network device 202 (e.g., in order to more easily transport network device 202). In another example, in the event that network device 202 is powered by a battery, the battery may run out of power at some point after network device 202 has been stolen. As such, processing unit 106 may monitor network device 202 for any indication that network device 202 is experiencing an unscheduled power outage.

In some embodiments, processing unit 106 may utilize a dying gasp capacitor or any type of backup or temporary power source within or accessible to network device 202 to detect that network device 202 is experiencing an unscheduled power outage. The term "dying gasp capacitor," as used herein, generally refers to any type or form of capacitive or charge-storing element in an electronic circuit that discharges a relatively small amount of energy after a power supply is removed from the circuit. The energy discharged from a dying gasp capacitor may be used to perform any final task for a computing device, such as sending a notification to an administrator that the device is experiencing a power outage.

In an exemplary embodiment, network device 202 may be configured with a dying gasp capacitor that discharges a certain amount of energy in response to network device 202 being disconnected from an external power supply. In this embodiment, processing unit 106 may utilize the energy from the dying gasp capacitor to distribute a message (e.g., an email, text, or SMS) to an administrator of network device 202 (e.g., to an email address, phone number, or website managed by the administrator). The message may include any of a variety of information about the power outage, such as the time and/or location at which the power outage occurred.

Figure 5:
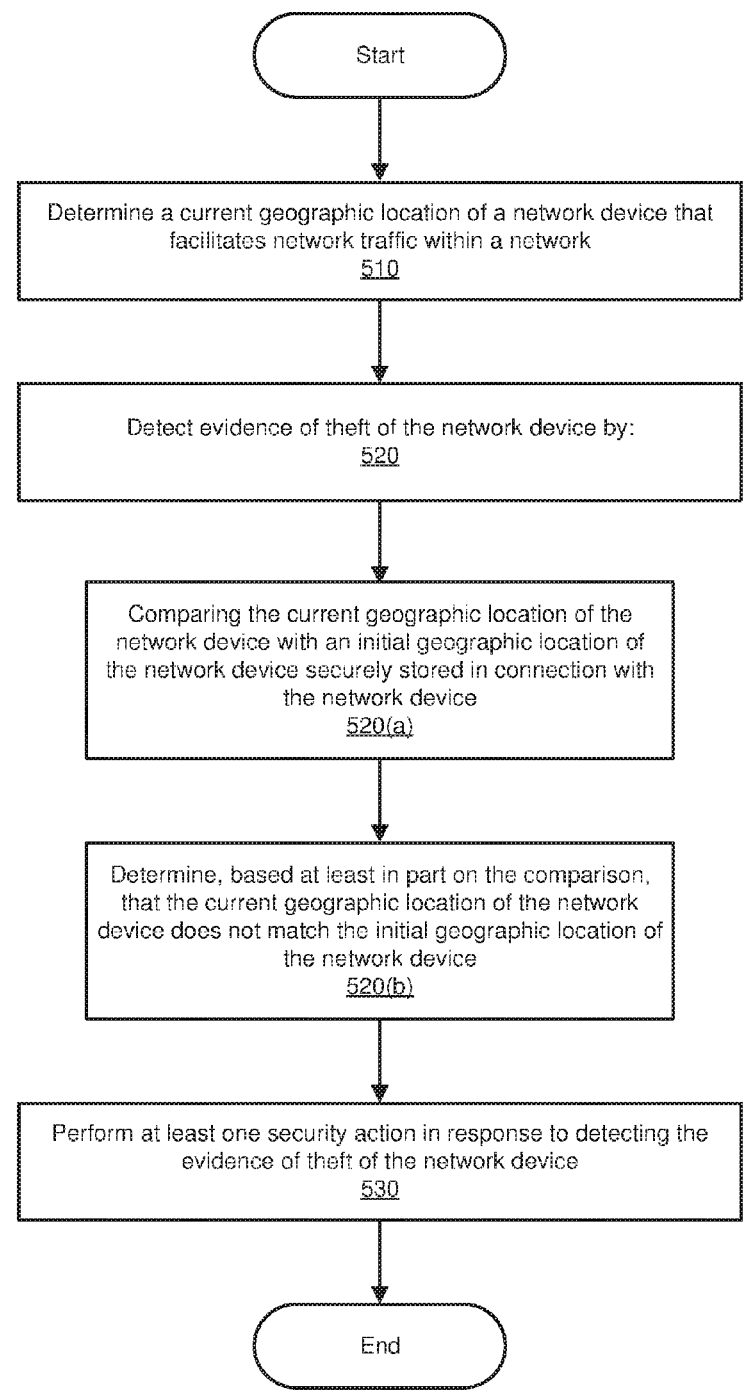
FIG. 5 is a flow diagram of an exemplary method for detecting theft of network devices.

FIG. 5 is a flow diagram of an exemplary method 500 for detecting evidence of theft of network devices. Method 500 may include the step of determining a current geographic location of a network device that facilitates network traffic within a network (510). This determining step may be performed in a variety of ways. For example, processing unit 106 may, as part of network device 202 in FIG. 2, query a GPS within network device 202 for the location of network device 202. Additionally or alternatively, processing unit 106 may use Internet Protocol (IP) address geolocation and/or any suitable technique to identify the current location of network device 202. After determining the current location of network device 202, processing unit 106 may store (e.g., within a fast-access section of memory of processing unit 106), information that identifies the current location of network device 202.

Processing unit 106 may determine the current geographic location of network device 202 at a variety of times and/or in a variety of contexts. For example, processing unit 106 may determine the current location of network device 202 on a periodic basis, such as every 5 seconds or every minute. Additionally or alternatively, processing unit 106 may determine the current location of network device 202 in response to each reboot of network device 202.

Returning to FIG. 5, method 500 may additionally include the step of detecting evidence of theft of the network device by (1) comparing the current geographic location of the network device with an initial geographic location of the network device securely stored in connection with the network device and (2) determining, based at least in part on the comparison, that the current geographic location of the network device does not match the initial geographic location of the network device (520, 520(*a*), and 520(*b*)). This detecting step may be performed in a variety of ways. In some examples, processing unit 106 may, as part of network device 202 in FIG. 2, retrieve information that identifies the initial geographic location of network device 202 from within storage device 102. Processing unit 106 may have previously stored this information securely within storage device 102 (e.g., within a TPM chip of storage device 102). For example, storage device 102 may have been programmed with information that identifies the initial location of network device 202 before or during installation or deployment of network device 202.

After retrieving the information that identifies the initial location of network device 202, processing unit 106 may compare the initial location information with the current location information (identified in step 510). In some examples, processing unit 106 may determine that the current location information does not match the initial location information. For example, processing unit 106 may determine that the GPS coordinates describing the current location of network device 202 do not match the GPS coordinates describing the initial location of network device 202. In this example, processing unit 106 may detect evidence of theft of network device 202 based on the GPS coordinates not matching the GPS coordinates describing the initial location.

In some embodiments, processing unit 106 may determine that the current location of network device 202 is beyond a certain distance from the initial location of network device 202. For example, processing unit 106 may determine, based on the information that identifies the initial and current locations of network device 202, that network device 202 is currently more than a threshold distance (e.g., one block, half a mile, etc.) from the initial location of network device 202. In another example, processing unit 106 may determine that network device 202 is currently in a different geographic area (e.g., street, neighborhood, city, etc.) than the geographic area in which network device 202 was installed. In this example, processing unit 106 may detect evidence of theft of network device 202 based on determining that the current location of network device 202 is beyond the certain distance from the initial location of network device 202.

In some examples, processing unit 106 may monitor network device 202 for additional evidence of theft of network device 202. For example, processing unit 106 may monitor network device 202 to determine whether an external power supply that provides power to network device 202 has been disconnected or discontinued, resulting in an unexpected power outage. In some examples, an unexpected power outage to network device 202 may indicate that a thief has removed network device 202 from a power source in order to more easily transport network device 202. In response to detecting that network device 202 is experiencing an unexpected power outage, processing unit 106 may utilize a dying gasp capacitor to notify an administrator about the additional evidence of theft of network device 202. For example, processing unit 106 may use the energy discharged from the dying gasp capacitor to distribute a message to the administrator about the time and/or location of network device 202 when the potential theft occurred.

Returning to FIG. 5, method 500 may further include the step of performing at least one security action in response to detecting the evidence of theft of the network device (530). This performing step may be performed in a variety of ways. In one example, processing unit 106 may, as part of network device 202 in FIG. 2, direct network device 202 to operate within a restricted mode of operation in response to detecting evidence of theft of network device 202. Processing unit 106 may implement the restricted mode of operation by enforcing a variety of rules or limitations on the behavior or functionality of network device 202. For example, processing unit 106 may prevent network device 202 from performing a boot up operation, prevent network device 202 from facilitating network traffic, prevent any changes from being made to the configuration of network device 202, and/or prevent a user from accessing data stored within network device 202. In some examples, processing unit 106 may enforce the restricted mode of operation until determining that a user has entered, into network device 202, authentication credentials that enable network device 202 to return to a normal mode of operation.

In addition to or instead of directing network device 202 to operate within a restricted mode of operation, processing unit 106 may notify an administrator about the evidence of theft of network device 202. For example, processing unit 106 may send a message to an administrator that alerts the administrator about the evidence of theft of network device 202 and the time and/or location at which the potential theft occurred. In some examples, processing unit 106 may continue to update an administrator with information describing the location of network device 202 until network device 202 has been recovered or the threat of theft has been nullified.

As explained above in connection with FIGS. 1-5, a network device (such as a router or switch) may securely store an initial location of the network device. While in operation, the network device may periodically (e.g., at certain time intervals and/or in response to boot up operations of the network device) determine a current location of the network device. The network device may then compare the current location of the network device with the initial location of the network device.

In the event that the current and initial locations do not match (e.g., the current location is beyond a certain distance from the initial location), the network device may detect evidence of theft of the network device. In response, the network device may perform one or more security actions to mitigate the threat caused by potential theft of the network device. For example, the network device may enter a restricted mode of operation that limits the functionality of the network device and protects sensitive data handled by the network device. Additionally or alternatively, the network device may notify an administrator of the network device about the evidence of theft of the network device.

Figure 6:
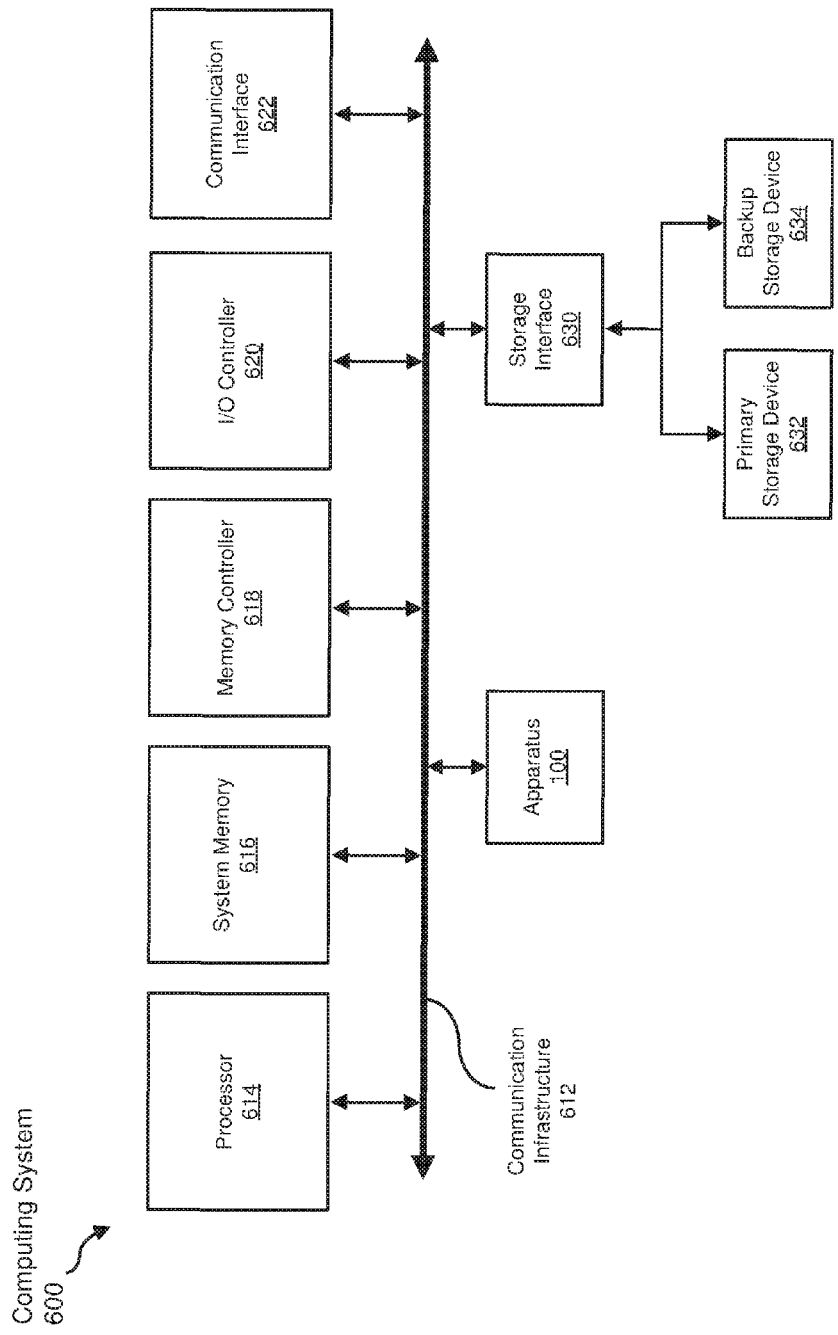
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 5. All or a portion of computing system 600 may also perform and/or be a means for performing and/or implementing any other steps, methods, or processes described and/or illustrated herein. In one example, computing system 600 may include apparatus 100 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a USB protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an ASIC, a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, RAM, ROM, flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an I/O controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, USB, IEEE 1394 host adapters, ATA, Parallel ATA (DATA), SATA, and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive a geographic location of a network device, transform the geographic location of the network device into evidence of theft of the network device, output a result of the transformation to an administrator of the network device, use the result of the transformation to mitigate the theft of the network device, and store the result of the transformation in a database or server. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a Trusted Platform Module (TPM) chip that securely stores, within a Platform Configuration Register (PCR), an initial geographic location of a network device that has an increased risk of theft due to being deployed in an insecure location; and
   a processing unit communicatively coupled to the TPM chip, wherein the processing unit:

determines, in response to detecting a boot up operation of the network device, a current geographic location of the network device;

before the boot up operation is completed, detects evidence of theft of the network device by:
comparing the current geographic location of the network device with the initial geographic location of the network device securely stored in the PCR; and
determining, based at least in part on the comparison, that the current geographic location of the network device does not match the initial geographic location of the network device; and in response to detecting the evidence of theft of the network device, protects the network device from threats of theft by directing the TPM chip to prevent the boot up operation until the current geographic location of the network device matches the initial geographic location of the network device securely stored in the PCR.

2. The apparatus of claim 1, wherein the processing unit determines the current geographic location of the network device using a Global Positioning System (GPS) of the network device.

3. The apparatus of claim 1, wherein the processing unit determines the current geographic location of the network device on a periodic basis.

4. The apparatus of claim 1, wherein the processing unit determines that the current geographic location of the network device is beyond a certain distance from the initial geographic location of the network device.

5. The apparatus of claim 1, wherein the processing unit further protects the network device from threats of theft by at least one of:
preventing the network device from facilitating network traffic;
preventing any changes from being made to the configuration of the network device; and
preventing a user from accessing data stored within the network device.

6. The apparatus of claim 1, wherein the processing unit:
determines that an external power supply that provides power to the network device has been disconnected from the network device; and
detects additional evidence of theft of the network device based at least in part on the external power supply having been disconnected from the network device.

7. The apparatus of claim 6, wherein the processing unit performs a security action in response to detecting the additional evidence of theft of the network device by utilizing a dying gasp capacitor accessible to the network device.

8. The apparatus of claim 7, wherein the security action comprises notifying an administrator of the network device about the additional evidence of theft of the network device.

9. A system comprising:
a Trusted Platform Module (TPM) chip that securely stores, within a Platform Configuration Register (PCR), an initial geographic location of a router that has an increased risk of theft due to being deployed in an insecure location; and
a processing unit communicatively coupled to the TPM chip, wherein the processing unit:
determines, in response to detecting a boot up operation of the router, a current geographic location of the router;

before the boot up operation is completed, detects evidence of theft of the router by:
comparing the current geographic location of the router with the initial geographic location of the router securely stored in the PCR; and
determining, based at least in part on the comparison, that the current geographic location of the router does not match the initial geographic location of the router; and in response to detecting the evidence of theft of the router, protects the router from threats of theft by directing the TPM chip to prevent the boot up operation until the current geographic location of the router matches the initial geographic location of the router securely stored in the PCR.

10. The system of claim 9, wherein the processing unit further protects the router from threats of theft by at least one of:
preventing the router from facilitating network traffic;
preventing any changes from being made to the configuration of the router; and
preventing a user from accessing data stored within the router.

11. The system of claim 9, wherein the processing unit:
determines that an external power supply that provides power to the router has been disconnected from the router; and
detects additional evidence of theft of the router based at least in part on the external power supply having been disconnected from the router.

12. The system of claim 11, wherein the processing unit performs a security action in response to detecting the additional evidence of theft of the router by utilizing a dying gasp capacitor accessible to the router.

13. The system of claim 12, wherein the security action comprises notifying an administrator of the router about the additional evidence of theft of the router.

14. A method comprising:
detecting a boot up operation of a network device that has an increased risk of theft due to being deployed in an insecure location;
determining, in response to detecting the boot up operation, a current geographic location of the network device;
before the boot up operation is completed, detecting evidence of theft of the network device by:
comparing the current geographic location of the network device with an initial geographic location of the network device securely stored within a Platform Configuration Register (PCR) of a Trusted Platform Module (TPM) chip, the TPM chip being communicatively coupled to the network device; and
determining, based at least in part on the comparison, that the current geographic location of the network device does not match the initial geographic location of the network device; and
in response to detecting the evidence of theft of the network device, protecting the network device from threats of theft by directing the TPM chip to prevent the boot up operation until the current geographic location of the network device matches the initial geographic location of the network device securely stored in the PCR.

* * * * *